United States Patent
Ketsuka et al.

(10) Patent No.: US 9,052,857 B2
(45) Date of Patent: Jun. 9, 2015

(54) PROCESSING INSTRUCTION DEVICE, PROCESSING APPARATUS, AND NON-TRANSITORY COMPUTER READABLE MEDIUM

(71) Applicant: FUJI XEROX CO., LTD., Minato-ku, Tokyo (JP)

(72) Inventors: Masakazu Ketsuka, Kanagawa (JP); Takafumi Kumazaki, Kanagawa (JP); Tokihiro Ishiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 29 days.

(21) Appl. No.: 14/104,526

(22) Filed: Dec. 12, 2013

(65) Prior Publication Data

US 2014/0355044 A1 Dec. 4, 2014

(30) Foreign Application Priority Data

May 31, 2013 (JP) ................................ 2013-115830

(51) Int. Cl.
  *G06F 3/12* (2006.01)
(52) U.S. Cl.
  CPC .................................... *G06F 3/1253* (2013.01)
(58) Field of Classification Search
  None
  See application file for complete search history.

(56) References Cited

U.S. PATENT DOCUMENTS

| 2010/0269063 | A1 | 10/2010 | Takazawa | |
|---|---|---|---|---|
| 2012/0120435 | A1* | 5/2012 | Osada | 358/1.13 |
| 2013/0169831 | A1* | 7/2013 | Tomi | 348/207.2 |

FOREIGN PATENT DOCUMENTS

JP  2010-250561 A  11/2010

* cited by examiner

*Primary Examiner* — King Poon
*Assistant Examiner* — Andrew H Lam
(74) *Attorney, Agent, or Firm* — Sughrue Mion, PLLC

(57) ABSTRACT

A processing instruction device includes a memory, a display instruction data acquisition unit, a changing unit, a display controller, an operation data acquisition unit, and a processing instruction unit. The memory stores management data and first display instruction data. The display instruction data acquisition unit acquires second display instruction data from an external device. The changing unit specifies second processing identification data corresponding to display position identification data, specifies first processing identification data corresponding to the specified second processing identification data, and changes the first processing identification data corresponding to the display position identification data to the specified first processing identification data. The display controller causes a display device to display an image in accordance with the first or second display instruction data. The operation data acquisition unit acquires operation data. The processing instruction unit gives an instruction to perform processing in accordance with processing instruction data.

6 Claims, 10 Drawing Sheets

| USER ID | AUTHENTICATION CODE | PRIVILEGE DATA |
|---------|---------------------|----------------|
| . . .   | . . .               | . . .          |
| . . .   | . . .               | . . .          |
| . . .   | . . .               | . . .          |

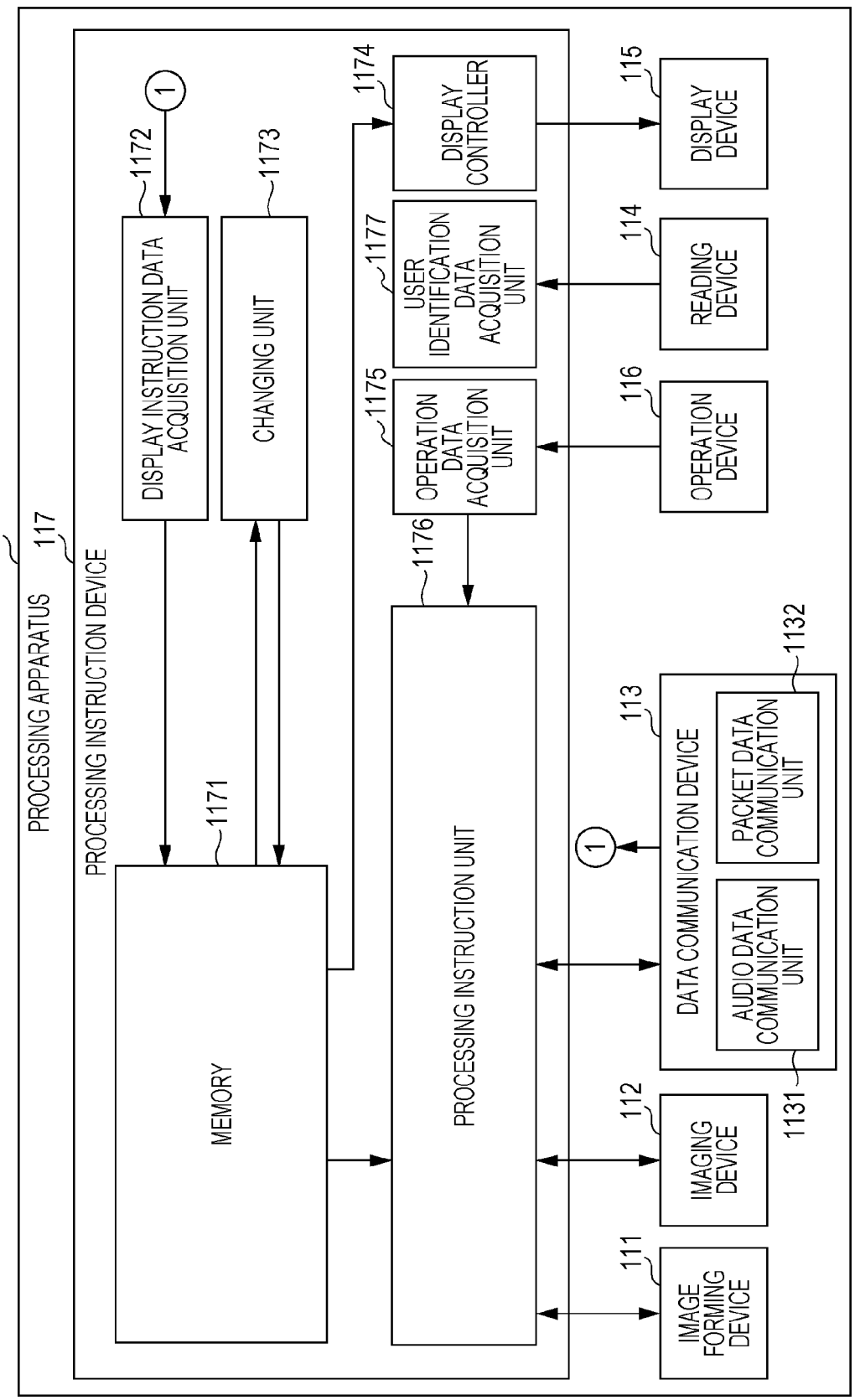

FIG. 5A

| REGISTRATION ID | PROCESSING ID | PROCESSING NAME | PROCESSING INSTRUCTION DATA |
|---|---|---|---|
| R01 | N001 | BASIC COPYING | ... |
| R02 | N002 | BASIC SCANNING | ... |
| R03 | N003 | BASIC FAX | ... |
| R04 | P105 | SIMPLE COPYING | ... |
| R05 | P238 | SIMPLE SCANNING | ... |
| R06 | P035 | SIMPLE FAX | ... |
| ⋮ | ⋮ | ⋮ | ⋮ |

FIG. 5B

| REGISTRATION ID | PROCESSING ID | PROCESSING NAME | PROCESSING INSTRUCTION DATA |
|---|---|---|---|
| R01 | N001 | BASIC COPYING | ... |
| R02 | N002 | BASIC SCANNING | ... |
| R03 | N003 | BASIC FAX | ... |
| R04 | P238 | SIMPLE SCANNING | ... |
| R05 | — | — | — |
| R06 | P105 | SIMPLE COPYING | ... |
| ⋮ | ⋮ | ⋮ | ⋮ |

FIG. 6A
USER ID: 1234
| DISPLAY POSITION | REGISTRATION ID | PROCESSING ID |
|---|---|---|
| 1 | R01 | N001 |
| 2 | R06 | P035 |
| 3 | R04 | P105 |
| ⋮ | ⋮ | ⋮ |
FIG. 6B
USER ID: 1234
| DISPLAY POSITION | REGISTRATION ID | PROCESSING ID |
|---|---|---|
| 1 | R01 | N001 |
| 2 | R02 | N002 |
| 3 | R03 | N003 |
| ⋮ | ⋮ | ⋮ |
FIG. 7A
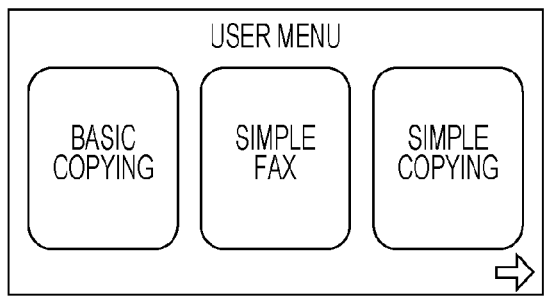
FIG. 7B
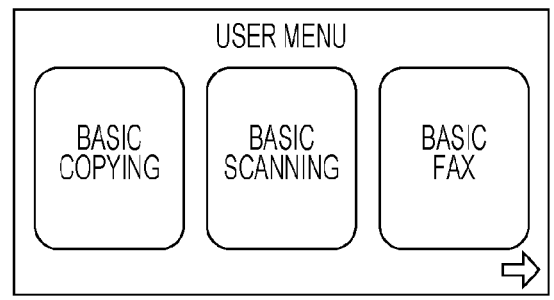
FIG. 8
USER ID: 1234
| DISPLAY POSITION | PROCESSING ID |
|---|---|
| 1 | N001 |
| 2 | P035 |
| 3 | P105 |
| ⋮ | ⋮ |

FIG. 9A
USER ID: 1234

| DISPLAY POSITION | REGISTRATION ID | PROCESSING ID |
|---|---|---|
| 1 | R01 | N001 |
| 2 | R02 | N002 |
| 3 | R03 | N003 |
| ⋮ | ⋮ | ⋮ |

FIG. 9B
USER ID: 1234

| DISPLAY POSITION | PROCESSING ID |
|---|---|
| 1 | N001 |
| 2 | P035 |
| 3 | P105 |
| ⋮ | ⋮ |

FIG. 9C
USER ID: 1234

| DISPLAY POSITION | REGISTRATION ID | PROCESSING ID |
|---|---|---|
| 1 |  | N001 |
| 2 |  | P035 |
| 3 |  | P105 |
| ⋮ |  | ⋮ |

FIG. 9D

| REGISTRATION ID | PROCESSING ID | PROCESSING NAME | PROCESSING INSTRUCTION DATA |
|---|---|---|---|
| R01 | N001 | BASIC COPYING | ⋯ |
| R02 | N002 | BASIC SCANNING | ⋯ |
| R03 | N003 | BASIC FAX | ⋯ |
| R04 | P238 | SIMPLE SCANNING | ⋯ |
| R05 | — | — | — |
| R06 | P105 | SIMPLE COPYING | ⋯ |
| ⋮ | ⋮ | ⋮ | ⋮ |

FIG. 9E
USER ID: 1234

| DISPLAY POSITION | REGISTRATION ID | PROCESSING ID |
|---|---|---|
| 1 | R01 | N001 |
| 2 | — | P035 |
| 3 | R06 | P105 |
| ⋮ | ⋮ | ⋮ |

FIG. 10
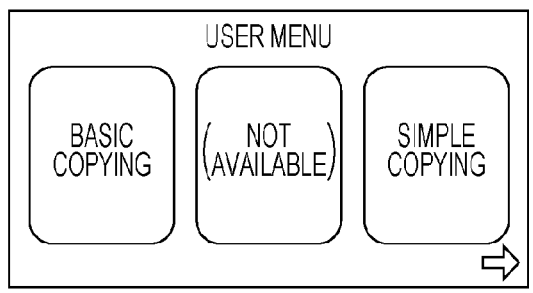
FIG. 11A
USER ID: 1234
| DISPLAY POSITION | REGISTRATION ID | PROCESSING ID |
|---|---|---|
| 1 | R01 | N001 |
| 2 | R06 | P035 |
| 3 | R04 | P105 |
| ⋮ | ⋮ | ⋮ |
FIG. 11B
| REGISTRATION ID | PROCESSING ID | PROCESSING NAME | PROCESSING INSTRUCTION DATA |
|---|---|---|---|
| R01 | N001 | BASIC COPYING | ⋯ |
| R02 | N002 | BASIC SCANNING | ⋯ |
| R03 | N003 | BASIC FAX | ⋯ |
| R04 | P238 | SIMPLE SCANNING | ⋯ |
| R05 | — | — | — |
| R06 | P105 | SIMPLE COPYING | ⋯ |
| ⋮ | ⋮ | ⋮ | ⋮ |
FIG. 11C
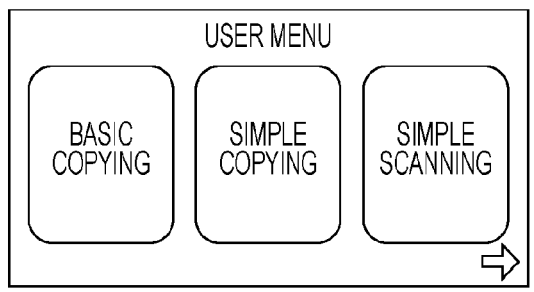

USER ID: 1234

| DISPLAY POSITION | REGISTRATION ID | PROCESSING ID |
|---|---|---|
| 1 | R01 | N001 |
| 2 | — | P035 |
| 3 | R06 | P105 |
| ⋮ | ⋮ | ⋮ |

| REGISTRATION ID | PROCESSING ID | PROCESSING NAME | PROCESSING INSTRUCTION DATA |
|---|---|---|---|
| R01 | N001 | BASIC COPYING | ... |
| R02 | N002 | BASIC SCANNING | ... |
| R03 | N003 | BASIC FAX | ... |
| R04 | P238 | SIMPLE SCANNING | ... |
| R05 | P035 | SIMPLE FAX | ... |
| R06 | P105 | SIMPLE COPYING | ... |
| ⋮ | ⋮ | ⋮ | ⋮ |

USER ID: 1234

| DISPLAY POSITION | REGISTRATION ID | PROCESSING ID |
|---|---|---|
| 1 | R01 | N001 |
| 2 | R05 | P035 |
| 3 | R06 | P105 |
| ⋮ | ⋮ | ⋮ |

PROCESSING INSTRUCTION DEVICE, PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-115830 filed May 31, 2013.

BACKGROUND (i) Technical Field

The present invention relates to a processing instruction device, a processing apparatus, and a non-transitory computer readable medium.

(ii) Related Art

Some of various processing apparatuses, for example, image forming apparatuses such as printers, imaging apparatuses such as scanners, data communication apparatuses such as facsimile machines, or multi-functional apparatuses having these functions integrated into single units, have a function to display a menu for prompting a user to select one of multiple processing operations executable thereon.

SUMMARY

According to an aspect of the invention, there is provided a processing instruction device including a memory, a display instruction data acquisition unit, a changing unit, a display controller, an operation data acquisition unit, and a processing instruction unit. The memory stores management data and first display instruction data. The management data is data for managing one or more pieces of processing instruction data each being data for instructing at least one of an image forming device, an imaging device, and a data communication device to perform processing. The first display instruction data is data for giving an instruction to display an image which prompts a user to select one of one or more pieces of processing instruction data among the one or more pieces of processing instruction data managed in the management data. The display instruction data acquisition unit acquires, from an external device, second display instruction data for giving an instruction to display an image which prompts a user to select one of one or more pieces of processing instruction data. The management data includes one or more pieces of processing instruction data available on a processing apparatus including the processing instruction device, first processing identification data uniquely identifying each of the one or more pieces of processing instruction data in the processing apparatus, and second processing identification data uniquely identifying each of the one or more pieces of processing instruction data in the processing apparatus and the external device. The first display instruction data includes display position identification data identifying a display position of an operator in an image, the operator corresponding to each of one or more pieces of processing instruction data for prompting a user to select processing, and first processing identification data uniquely identifying each of the one or more pieces of processing instruction data in the processing apparatus. The second display instruction data includes display position identification data identifying a display position of an operator in an image, the operator corresponding to each of one or more pieces of processing instruction data for prompting a user to select processing, and second processing identification data uniquely identifying each of the one or more pieces of processing instruction data in the processing apparatus and the external device. The changing unit specifies second processing identification data corresponding to each of the one or more pieces of display position identification data included in the first display instruction data, from among the one or more pieces of second processing identification data included in the second display instruction data, specifies first processing identification data corresponding to the specified second processing identification data from among the one or more pieces of first processing identification data included in the management data, and changes the first processing identification data corresponding to the piece of display position identification data included in the first display instruction data to the specified first processing identification data. The display controller causes a display device to display an image in accordance with the first display instruction data or the second display instruction data. The operation data acquisition unit acquires operation data indicating an operation of a user from an operation device that receives a user operation. In a case where the operation data acquisition unit acquires operation data indicating an operation on one of one or more operators included in an image while the image is being displayed on the display device, the processing instruction unit instructs at least one of the image forming device, the imaging device, and the data communication device to perform processing in accordance with processing instruction data corresponding to the one operator.

BRIEF DESCRIPTION OF THE DRAWINGS

An exemplary embodiment of the present invention will be described in detail based on the following figures, wherein:

FIG. 4 illustrates a functional configuration of a processing instruction device according to the exemplary embodiment;

FIGS. 5A and 5B are tables indicating management data according to the exemplary embodiment;

FIGS. 6A and 6B illustrate tables indicating first display instruction data according to the exemplary embodiment;

FIGS. 7A and 7B illustrate screens displayed on the processing apparatus according to the exemplary embodiment;

FIG. 8 illustrates second display instruction data according to the exemplary embodiment;

FIGS. 9A to 9E illustrate a process for changing the first display instruction data according to the exemplary embodiment;

FIG. 10 illustrates a screen displayed on the processing apparatus according to the exemplary embodiment;

FIGS. 11A to 11C illustrate screens displayed in accordance with display instruction data which is copied in the related art;

DETAILED DESCRIPTION

A data processing system 1 according to an exemplary embodiment of the present invention will be described hereinafter. The data processing system 1 includes multiple processing apparatuses, and each of the multiple processing apparatuses provides a user with multiple functions such as printing, scanning, copying, and facsimile (fax) functions.

In each of the processing apparatuses included in the data processing system 1, a user menu screen (an image used as a user interface customized by a user to select a processing operation) is available. A user is able to set the individual settings to a user menu screen on each of the multiple processing apparatuses. However, the setting operation is time-consuming. In the data processing system 1, therefore, data indicating a user menu screen set by a user on a certain processing apparatus may be utilized on another processing apparatus. Accordingly, once a user sets the settings to a user menu screen on one of the processing apparatuses, the user may also be able to utilize the user menu screen on the other processing apparatuses without setting the individual settings to the user menu screen.

Figures 1, 2:
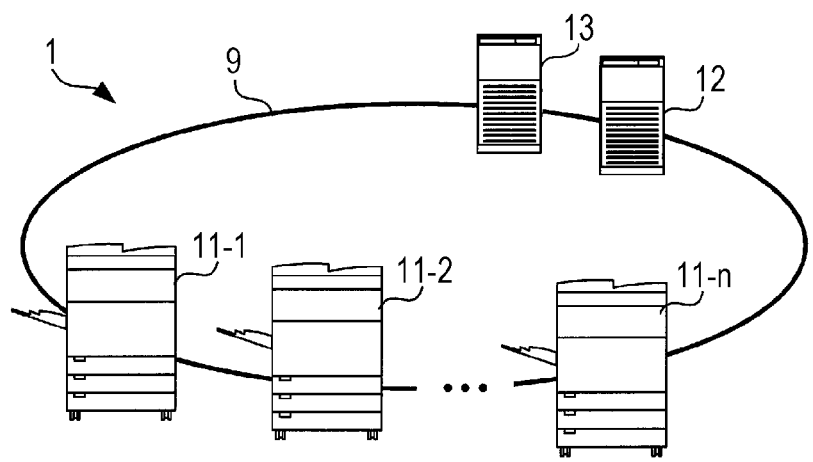
FIG. 1 illustrates an overall configuration of a data processing system according to an exemplary embodiment.
FIG. 2 illustrates a data configuration of a user authentication table according to the exemplary embodiment.

FIG. 1 illustrates an overall configuration of the data processing system 1. The data processing system 1 includes n processing apparatuses (where n is a natural number), namely, processing apparatuses 11-1, 11-2, . . . , and 11-n, a distribution server device 12, and an authentication server device 13. In the following description, the multiple processing apparatuses included in the data processing system 1 are collectively referred to as "processing apparatuses 11" or are each referred to as a "processing apparatus 11" unless they are distinguished from one another. Each of the processing apparatuses 11 may perform data communication with the distribution server device 12 and the authentication server device 13 via a network 9.

Each of the processing apparatuses 11 includes, for example, an image forming device, an imaging device, a data communication device, and so forth, and is configured to cause these devices to operate in association with one another to provide a user with various functions such as printing, scanning, copying, and facsimile (fax) functions. The same user may be able to use the multiple processing apparatuses 11.

The distribution server device 12 is a server device configured to store various data available on the processing apparatuses 11, such as a plug-in program, and to distribute, for example, requested data to a processing apparatus 11 in accordance with a distribution request from the processing apparatus 11.

The authentication server device 13 is a server device that serves to authenticate a user and to notify a processing apparatus 11 of functions available to the authenticated user among the various functions provided by the processing apparatus 11.

FIG. 2 illustrates a data configuration of a user authentication table managed by the authentication server device 13. The user authentication table is a collection of data records each relating to one of multiple users who use the data processing system 1, and each data record has data fields "user ID", "authentication code", and "privilege data".

The data field "user ID" stores user IDs each identifying a user. The data field "authentication code" stores authentication codes each of which is data uniquely assigned to a user and used with the user ID to verify the identity of the user. The data processing system 1 adopts a mechanism in which a user ID and an authentication code are stored in a near field communication (NFC) card possessed by a user and the user places the NFC card on or holds the NFC card above a processing apparatus 11, thereby allowing the processing apparatus 11 to read the user ID and the authentication code and transmit them to the authentication server device 13. The authentication server device 13 searches the user authentication table for the combination of user ID and authentication code which is transmitted from the processing apparatus 11, and determines, based on the success or failure of the search, whether the authentication of the user is successful or not.

The data field "privilege data" stores privilege data indicating functions available or not available to the corresponding user. The privilege data may be data indicating, for example, "color copying function: not available", "scanning function: available", "fax function: not available", "number of copies allowed: up to 50 per action", and so forth. If the authentication of the user is successful, the authentication server device 13 transmits the privilege data stored in the retrieved data record to the processing apparatus 11. The processing apparatus 11 may specify the function that the user is authorized to use on the basis of the privilege data transmitted from the authentication server device 13.

Figure 3:
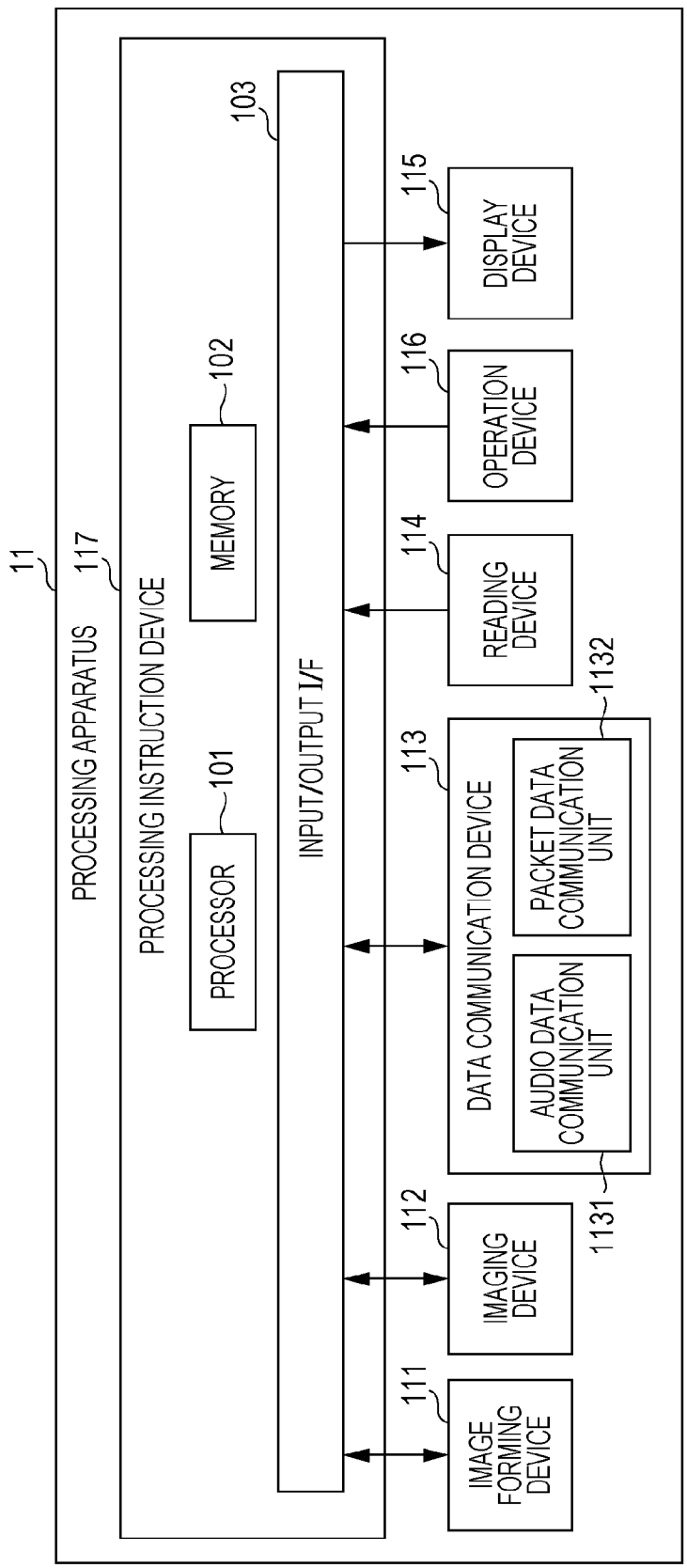
FIG. 3 illustrates a hardware configuration of a processing apparatus according to the exemplary embodiment.

FIG. 3 illustrates a hardware configuration of a processing apparatus 11. The processing apparatus 11 includes an image forming device 111, an imaging device 112, a data communication device 113, a reading device 114, a display device 115, an operation device 116, and a processing instruction device 117.

The image forming device 111 is a device configured to form an image on a sheet-shaped recording medium such as a sheet of paper using, for example, electrophotography. The printing method of the image forming device 111 is not limited to electrophotography, and any other method such as an inkjet printing method may be used. Some of the processing apparatuses 11 are capable of color printing, and others are capable of monochrome printing only.

The imaging device 112 is a device configured to optically read an image formed on a sheet-shaped recording medium placed on a document table to generate image data indicating the image.

The data communication device 113 is a device configured to transmit and receive various data to and from an external device. The data communication device 113 includes an audio data communication unit 1131 that performs audio data communication with an external facsimile (fax) device or the like via a telephone communication network, and a packet data communication unit 1132 that performs packet data communication with another processing apparatus 11, the distribution server device 12, the authentication server device 13, or the like via a packet data network.

The reading device 114 is a device (card reader) configured to read the user ID and authentication code recorded on an NFC card that is placed on or held above the reading device 114 by a user in accordance with the NFC standard. When a user brings an NFC card to the reading device 114 in a shorter distance than, for example, approximately 5 centimeters, the NFC card starts wireless communication by electric power induced by an electromagnetic wave emitted from the reading device 114, and transmits the user ID and the authentication code to the reading device 114 via radio transmission. The reading device 114 receives the user ID and authentication code transmitted from the NFC card to read the data recorded on the NFC car.

The display device 115 may be, for example, a liquid crystal display, and is configured to display various images such as a user menu screen. The operation device 116 may be, for example, a touch panel, and is configured to receive a touch operation performed by a user and generate operation data indicating the content of the touch operation. In the processing apparatus 11, the display device 115 and the operation device 116 may be stacked on each other to form a touch display. A user touches an image of an operator displayed on the display device 115 to experience intuitive interactions with the processing apparatus 11.

The processing instruction device 117 is a device configured to instruct the image forming device 111, the imaging device 112, or the data communication device 113 to execute the function selected by the user in accordance with a user operation on the operation device 116. The processing instruction device 117 includes a processor 101 configured to perform various data processing operations, a memory 102 configured to store various data, and an input/output interface (I/F) 103 configured to input and output various data to and from the other devices included in the processing apparatus 11. The processor 101 performs various data processing operations in accordance with a program stored in the memory 102, thereby serving as a device including the components described below.

FIG. 4 illustrates a functional configuration of the processing instruction device 117. In FIG. 4, the devices included in the processing apparatus 11, other than the processing instruction device 117, are also illustrated in order to demonstrate relationships between transmission and reception of data between the processing instruction device 117 and the other devices included in the processing apparatus 11.

The processing instruction device 117 includes, as functional components, a memory 1171, a display instruction data acquisition unit 1172, a changing unit 1173, a display controller 1174, an operation data acquisition unit 1175, a processing instruction unit 1176, and a user identification data acquisition unit 1177.

The memory 1171 stores data to be used by the processing instruction device 117 to instruct the image forming device 111 and the like to perform various processing operations. Specifically, the memory 1171 stores management data and first display instruction data. The management data is data for managing multiple processing operations executable by the processing apparatus 11. The first display instruction data is data for giving an instruction to display a user menu screen. In the data processing system 1, in addition to the first display instruction data to be used to display a user menu screen on a processing apparatus 11, second display instruction data (described below) that is delivered to or from a different processing apparatus 11 is also used.

FIGS. 5A and 5B are a table indicating management data stored in the memory 1171 of the processing apparatus 11-1 and a table indicating management data stored in the memory 1171 of the processing apparatus 11-2, respectively, by way of example.

The management data is a collection of data records each relating to a processing operation executable by the processing apparatus 11. Each data record has data fields "registration ID", "processing ID", "processing name", and "processing instruction data".

The data field "registration ID" stores registration IDs (first processing identification data) each of which is identification data uniquely identifying a processing operation in the processing apparatus 11 which stores the management data. The registration IDs are arranged in ascending order of the numbers subsequent to the letter "R" for the management data in any processing apparatus 11.

The data field "processing ID" stores processing IDs (second processing identification data) each of which is identification data identifying a unique processing operation which is common to the multiple processing apparatuses 11 included in the data processing system 1. The processing IDs include a processing ID starting with "N", and a processing ID starting with "P". The processing ID starting with "N" is a processing ID identifying a processing operation to be executed in accordance with a native program which is pre-installed in the processing apparatus 11 before it leaves the factory. The processing ID starting with "P" is a processing ID identifying a processing operation to be executed in accordance with a plug-in program which is downloaded from the distribution server device 12 after it leaves the factory and which is installed into the processing apparatus 11.

The data field "processing name" stores processing names, for example, "basic copying". The data field "processing instruction data" stores processing instruction data indicating the specific procedure or the like of the processing operations. The processing instruction data may be, for example, a code list for invoking a native program or plug-in program installed in the processing apparatus 11. The form of the processing instruction data is not limited to code list, and, for example, a plug-in program itself may be handled as processing instruction data.

In the example in FIGS. 5A and 5B, for processing operations to be executed in accordance with native programs, the same processing operation is registered in association with the same registration ID for the processing apparatus 11-1 and the processing apparatus 11-2. That is, the processing operations "basic copying", "basic scanning", and "basic FAX" identified by the processing IDs "N001", "N002", and "N003", respectively, are registered in association with the registration IDs "R01", "R02", and "R03", respectively.

In contrast, a processing operation to be executed in accordance with a plug-in program is registered in different manners for the processing apparatus 11-1 and the processing apparatus 11-2. Specifically, the processing operations "simple copying" and "simple scanning" identified by the processing IDs "P105" and "P238", respectively, are registered in the management data in both the processing apparatus 11-1 and the processing apparatus 11-2 but are associated with different registration IDs. The reason that these processing operations are associated with different registration IDs is that, for example, the order or timing in which the plug-in programs necessary for these processing operations were installed is different for the processing apparatus 11-1 and the processing apparatus 11-2.

The processing operation "simple FAX" identified by the processing ID "P035" is registered in the management data in the processing apparatus 11-1, but is not registered in the management data in the processing apparatus 11-2. That is, because of the reason such as the plug-in program necessary to execute this processing operation having not been installed in the processing apparatus 11-2, the processing operation "simple FAX" is not available on the processing apparatus 11-2.

The first display instruction data stored in the memory 1171 together with the management data described above is data for giving an instruction to display a user menu screen set by a user. FIGS. 6A and 6B are a table indicating the first display instruction data stored in the memory 1171 of the processing apparatus 11-1 and a table indicating the first display instruction data stored in the memory 1171 of the processing apparatus 11-2, respectively, by way of example.

The first display instruction data is generated for each user, and is thus associated with a user ID identifying the corresponding user. The first display instruction data is a collection of data records each relating to one of selection buttons (or operators) displayed on a user menu screen, and each data record has data fields "display position", "registration ID", and "processing ID".

The data field "display position" stores display position IDs (display position identification data) each identifying the display position of a selection button on the user menu screen. For example, the display position ID "1" indicates the leftmost position on the first page of the user menu screen. The data records included in the first display instruction data are sorted in ascending order by the values in the data field "display position".

The data field "registration ID" stores registration IDs each corresponding to processing instruction data to be executed when the user operates a selection button displayed at a display position identified by the data field "display position" in the same data record. In the state where the user menu screen is not being edited (in the state of the initial values), registration IDs are mechanically registered in ascending order of numbers for display position IDs in such a manner that the registration ID "N001" is registered for the display position ID "1", the registration ID "N002" is registered for the display position ID "2", and so forth.

The data field "processing ID" stores processing IDs each corresponding to a registration ID stored in the data field "registration ID" of the same data record. The term "a processing ID corresponding to a registration ID", as used herein, is used to indicate that a registration ID and a processing ID are stored in the same data record in the management data (FIGS. 5A and 5B). That is, the registration ID and processing ID stored in the same data record in the first display instruction data (the table illustrated in FIG. 6A) stored in the processing apparatus 11-1 are the registration ID and processing ID stored in the same data record in the management data (the table illustrated in FIG. 5A) stored in the processing apparatus 11-1. The same applies to the processing apparatus 11-2.

FIG. 6A illustrates an example of the first display instruction data in a case where the user has edited the user menu screen using the processing apparatus 11-1. FIG. 6B illustrates an example of the first display instruction data in a case where the user has not edited the user menu screen using the processing apparatus 11-2. Thus, the registration IDs are registered in order of their numbers in the table illustrated in FIG. 6B, whereas the order of the registered registration IDs does not follow the numbers in the table illustrated in FIG. 6A.

FIGS. 7A and 7B illustrate user menu screens displayed on the processing apparatuses 11 in accordance with the first display instruction data illustrated in FIGS. 6A and 6B. The screen illustrated in FIG. 7A is the user menu screen displayed on the display device 115 of the processing apparatus 11-1, and the screen illustrated in FIG. 7B is the user menu screen displayed on the display device 115 of the processing apparatus 11-2.

Referring back to FIG. 4, the description of the functional configuration of the processing instruction device 117 will be continued. The display instruction data acquisition unit 1172 acquires second display instruction data from another processing apparatus 11 when the user operates the operation device 116 to make an instruction to copy display instruction data. The second display instruction data is data that is generated from the first display instruction data stored in the source processing apparatus 11 and that is used to change the first display instruction data stored in the destination processing apparatus 11.

The procedure for acquiring the second display instruction data by the display instruction data acquisition unit 1172 will be specifically as follows: First, the display instruction data acquisition unit 1172 generates a transmission request of second display instruction data. The transmission request includes a user ID. The user ID is read by the reading device 114 from the NFC card of the user who is using the processing apparatus 11, and is acquired by the user identification data acquisition unit 1177 from the reading device 114.

The display instruction data acquisition unit 1172 instructs the packet data communication unit 1132 of the data communication device 113 to transmit the generated transmission request to another processing apparatus 11. In accordance with the instruction from the display instruction data acquisition unit 1172, the packet data communication unit 1132 transmits the transmission request to another processing apparatus 11, and receives second display instruction data from the other processing apparatus 11 in response to the transmission request. The second display instruction data received by the packet data communication unit 1132 is second display instruction data generated from the first display instruction data stored, in association with the user ID included in the transmission request, in the destination processing apparatus 11 to which the transmission request has been transmitted.

The packet data communication unit 1132 delivers the second display instruction data received from the other processing apparatus 11 to the display instruction data acquisition unit 1172. The display instruction data acquisition unit 1172 temporarily stores in the memory 1171 the second display instruction data acquired from the other processing apparatus 11 via the packet data communication unit 1132.

FIG. 8 illustrates second display instruction data generated by the processing apparatus 11-1 from the first display instruction data illustrated in FIG. 6A in accordance with the transmission request of second display instruction data from another processing apparatus 11. The second display instruction data is data obtained by deleting the data field "registration ID" from the first display instruction data. A copy of the first display instruction data may be used as it is as second display instruction data without deleting the data field "registration ID" from the first display instruction data. In this case, the requesting processing apparatus 11 does not use the data of the data field "registration ID" in the second display instruction data.

The changing unit 1173 changes the first display instruction data stored in the memory 1171 of the associated processing apparatus 11 using the second display instruction data acquired by the display instruction data acquisition unit 1172 from another processing apparatus 11.

FIGS. 9A to 9E illustrate a process for changing the first display instruction data, which is performed by the changing unit 1173 of the processing apparatus 11-2 in a case where the display instruction data acquisition unit 1172 of the processing apparatus 11-2 acquires second display instruction data from the processing apparatus 11-1, by way of example.

First, it is assumed that the processing apparatus 11-2 stores first display instruction data illustrated in FIG. 9A that has not been changed. It is also assumed that the processing apparatus 11-2 acquires second display instruction data illustrated in FIG. 9B from the processing apparatus 11-1. The changing unit 1173 clears the data field "registration ID" (or empties it of data) in the first display instruction data. Further, the changing unit 1173 overwrites the processing IDs in the data field "processing ID" of the data records in the first display instruction data with the processing IDs stored in the data records in the second display instruction data which store the corresponding display position IDs by copying. As a result, the first display instruction data is changed to that illustrated in FIG. 9C.

Then, the changing unit 1173 reads the management data (FIG. 9D) stored in the associated processing apparatus 11, namely, the processing apparatus 11-2, and overwrites the registration IDs in the data field "registration ID" of the data records in the first display instruction data illustrated in FIG. 9C with the registration IDs stored in the data records in the management data which store the corresponding processing IDs by copying. As a result, the first display instruction data is changed to that illustrated in FIG. 9E. In the first display instruction data illustrated in FIG. 9E, the data field "registration ID" of the data record for the display position ID "2" is left blank because the processing operation "simple FAX" identified by the processing ID "P035" has not been registered in the management data (FIG. 9D) stored in the processing apparatus 11-2 and thus is not available on the processing apparatus 11-2.

FIG. 10 illustrates a user menu screen displayed on the processing apparatus 11-2 in accordance with the first display instruction data (FIG. 9E) after the changing process illustrated in FIGS. 9A to 9E has been performed. As illustrated in FIG. 10, the user menu screen displayed in accordance with the first display instruction data changed in accordance with the second display instruction data acquired by the processing apparatus 11-2 from the processing apparatus 11-1 is similar to the user menu screen (FIG. 7A) displayed on the source processing apparatus 11-1 from which the second display instruction data has been acquired, except that the message "(Not available)" is displayed for the processing operation that is not available on the processing apparatus 11-2.

FIGS. 11A to 11C illustrate a user menu screen displayed on the processing apparatus 11-2 in a case where the processing apparatus 11-2 acquires a copy of the first display instruction data (FIG. 6A) stored in the processing apparatus 11-1 from the processing apparatus 11-1 and overwrites the first display instruction data stored therein with the first display instruction data acquired from the processing apparatus 11-1. In this case, the processing apparatus 11-2 reads from the management data (FIG. 11B) therein the data records which store the registration IDs common to the first display instruction data (FIG. 11A) acquired from the processing apparatus 11-1, and uses the read data records for display of a user menu screen. As a result, as illustrated in FIG. 11C, a user menu screen having no commonality with the source user menu screen is displayed.

In contrast, in the data processing system 1, as described above, the destination processing apparatus 11 to which a user menu screen is copied is configured to change registration IDs stored in the first display instruction data on the basis of processing IDs. Thus, a user menu screen having commonality between the destination processing apparatus 11 and the source processing apparatus 11 is displayed.

In some cases, a new processing operation may become available on a processing apparatus 11 because of the reason such as a new plug-in program having been installed into the processing apparatus 11, or a processing operation that has been made available may not become available on a processing apparatus 11 because of the reason such as an installed plug-in program having been uninstalled from the processing apparatus 11. In such cases, the management data (FIG. 5A or 5B) stored in the processing apparatus 11 is changed. If the management data is changed, the changing unit 1173 detects the change, and updates the first display instruction data in accordance with the changed management data.

Figures 12A, 12B, 12C, 13:
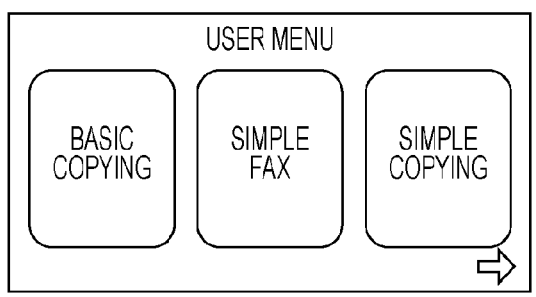
FIGS. 12A to 12C illustrate a process for updating the first display instruction data according to the exemplary embodiment.
FIG. 13 illustrates a screen displayed on the processing apparatus according to the exemplary embodiment.

FIGS. 12A to 12C illustrate a process for updating first display instruction data by the changing unit 1173 in accordance with a change in management data. First, it is assumed that the processing apparatus 11-2 stores first display instruction data illustrated in FIG. 12A. It is also assumed that the management data in the processing apparatus 11-2 has been changed in a manner illustrated in FIG. 12B. That is, the processing operation "simple FAX" identified by a new processing ID "P035" has become available on the processing apparatus 11-2, and the processing ID "P035" has been registered in association with the registration ID "R05".

In this case, the changing unit 1173 again executes a process for overwriting the registration IDs in the data field "registration ID" of the data records in the first display instruction data illustrated in FIG. 12A with the registration IDs stored in the data records in the management data (FIG. 12B) which store the corresponding processing IDs by copying. As a result, the first display instruction data is changed to that illustrated in FIG. 12C.

FIG. 13 illustrates a user menu screen displayed on the processing apparatus 11-2 in accordance with the first display instruction data (FIG. 12C) after the changing process illustrated in FIGS. 12A to 12C has been performed. As illustrated in FIG. 13, the processing operation "simple FAX" is selectable on the updated user menu screen displayed in accordance with the first display instruction data. The processing operation "simple FAX" is a processing operation that is displayed on the user menu screen of the processing apparatus 11-1 but not displayed on the user menu screen of the processing apparatus 11-2 because it is not available on the processing apparatus 11-2.

Referring back to FIG. 4, the description of the functional configuration of the processing instruction device 117 will be continued. The display controller 1174 instructs the display device 115 to display a user menu screen in accordance with the display instruction data stored in the memory 1171. The display controller 1174 also instructs the display device 115 to display various screens other than a user menu screen.

When the user touches the screen currently being displayed on the display device 115, such as a user menu screen, in accordance with the display controller 1174, the operation data acquisition unit 1175 receives operation data indicating the touch operation from the operation device 116.

If the operation data acquisition unit 1175 acquires operation data indicating the operation on one of the selection buttons displayed on the user menu screen, the processing instruction unit 1176 instructs the image forming device 111, the imaging device 112, the data communication device 113, or the like to execute the processing operation in accordance with the processing instruction data corresponding to the selection button on which the operation indicated by the operation data has been performed.

The user identification data acquisition unit 1177 acquires from the reading device 114 the user ID read by the reading device 114 from the NFC card.

The foregoing description has been directed to the functional configuration of the processing instruction device 117. The operation of the data processing system 1 will now be described with reference to an example of screens displayed on the display device 115 in accordance with an instruction given by the display controller 1174 of the processing instruction device 117.

Figure 14A:
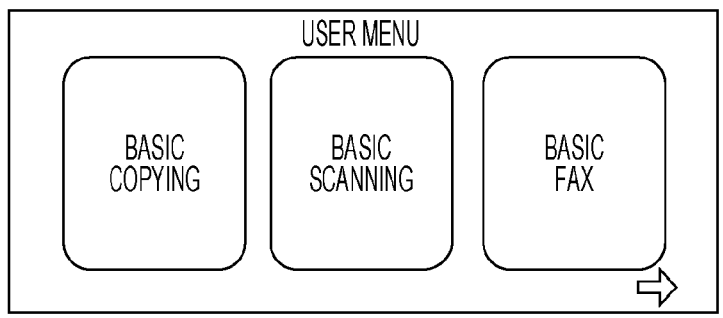
FIGS. 14A to 14E illustrate screens displayed on the processing apparatus according to the exemplary embodiment.
Figure 14B:
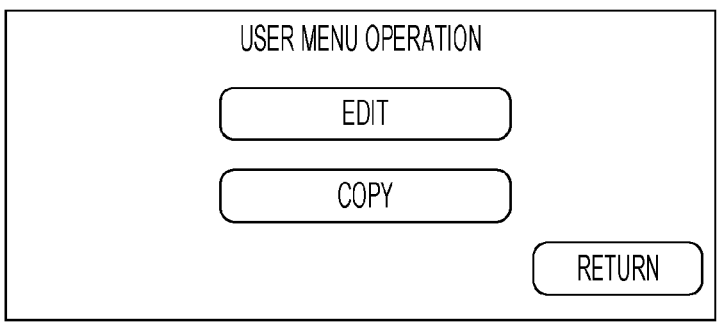

FIGS. 14A to 14E illustrate screens displayed on the display device 115 of the processing apparatus 11 when the user is to edit a default user menu screen. FIG. 14A illustrates a default user menu screen. For example, the user wishes to edit the default user menu screen. In this case, the user performs a predetermined operation on the operation device 116 to display a user menu operation screen (FIG. 14B) on the display device 115. When the user operates an "Edit" button on the user menu operation screen, a user menu edit screen (FIG. 14C) is displayed on the display device 115.

Figure 14C:
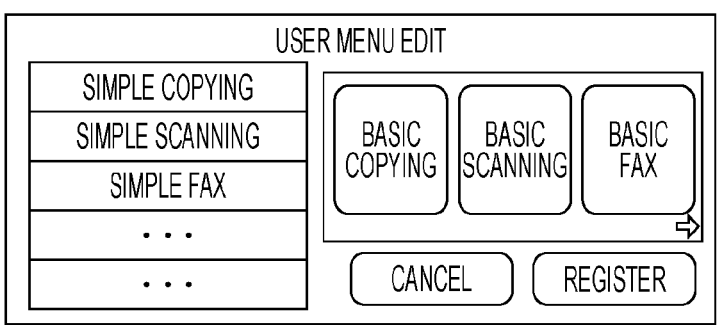
Figure 14D:
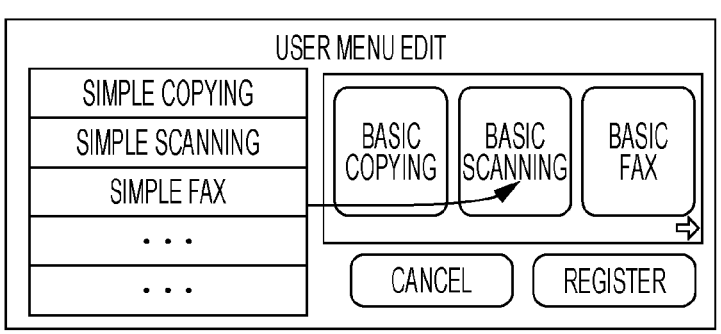
Figure 14E:
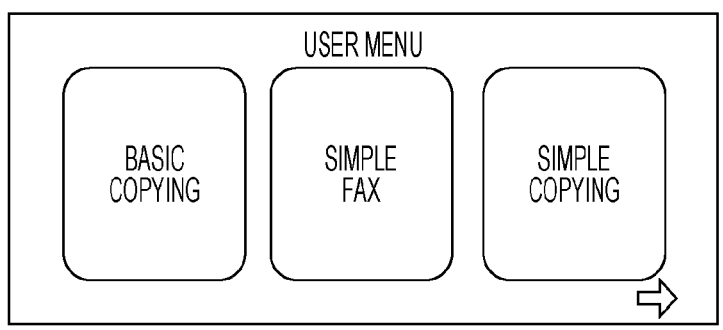

On the user menu edit screen, the processing names of processing operations available on the processing apparatus 11 are displayed as a list (left portion of FIG. 14C). The processing names displayed in the list are the processing names stored in the data field "processing name" in the processing table (FIG. 5A or 5B). The user drags the processing name of the processing operation for which the selection button is to be displayed on the user menu screen to the desired position in the frame in the right portion (design area) from the list (FIG. 14D), thereby being able to edit the design of the user menu screen.

The user repeatedly drags processing names to the design area from the list, if necessary. When the editing of the user menu screen is completed, the user operates a "Register" button to complete the editing of the user menu screen. In response to the operation of the "Register" button, the processing instruction device 117 updates the first display instruction data (FIG. 6A or 6B) so as to give an instruction to display the user menu screen edited by the user.

Then, when the user performs a predetermined operation on the operation device 116, the display controller 1174 of the processing instruction device 117 instructs the display device 115 to display a user menu screen in accordance with the first display instruction data stored in the memory 1171. As a result, the user menu screen edited by the user (FIG. 14E) is displayed on the display device 115.

When the user operates any of the selection buttons on the user menu screen, the operation data acquisition unit 1175 of the processing instruction device 117 acquires operation data indicating this operation from the operation device 116, and delivers the operation data to the processing instruction unit 1176. The processing instruction unit 1176 specifies the operated selection button using the delivered operation data, and reads the processing instruction data corresponding to the specified selection button from the processing table stored in the memory 1171. Then, the processing instruction unit 1176 instructs another device such as the image forming device 111 to perform the processing operation in accordance with the read processing instruction data. The image forming device 111 or the like executes the processing operation in accordance with the instruction, thereby providing a service to the user.

FIGS. 15A to 15D illustrate screens displayed on the display device 115 of the destination processing apparatus 11 in the operation for making a user menu screen similar to a user menu screen displayed on a certain processing apparatus 11 available on other processing apparatuses 11 (hereinafter referred to as "copying of a user menu screen", for convenience of description).

Figure 15A:
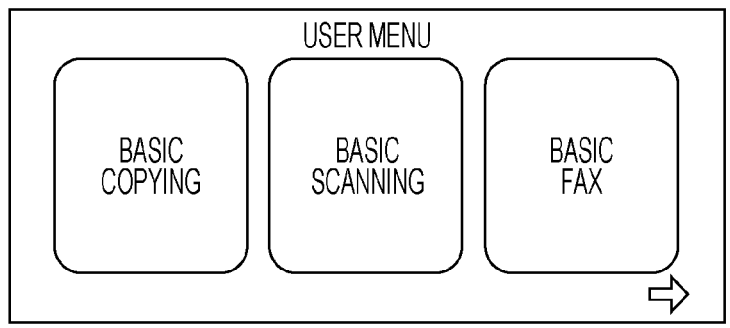
FIGS. 15A to 15D illustrate screens displayed on the processing apparatus according to the exemplary embodiment.
Figure 15B:
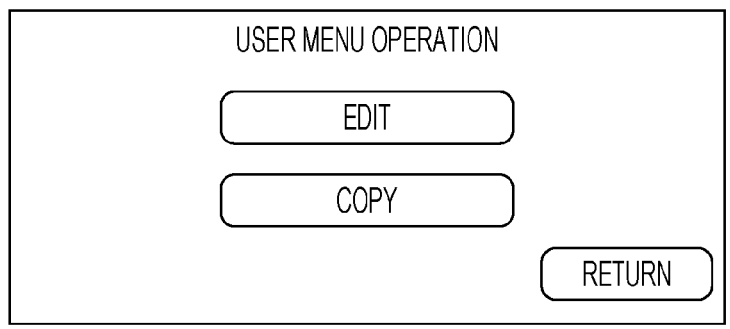
Figure 15C:
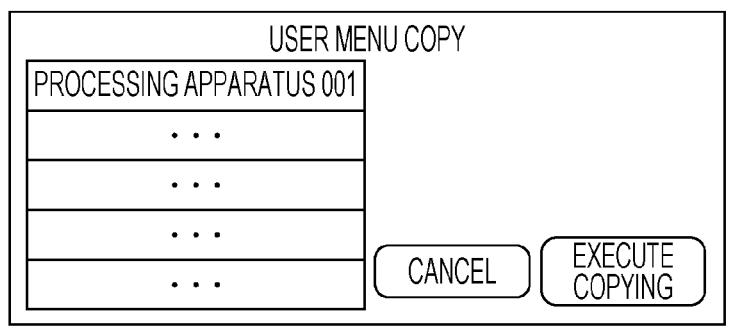
Figure 15D:
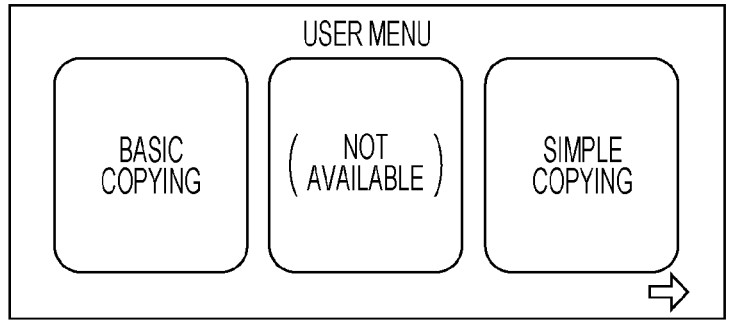

FIG. 15A illustrates a default user menu screen. For example, the user wishes to, instead of editing the default user menu screen, replace the default user menu screen with a user menu screen edited using a different processing apparatus 11 by copying. In this case, the user operates a "Copy" button on the user menu operation screen (FIG. 15B). In response to this operation, a user menu copy screen (FIG. 15C) is displayed on the display device 115. On the user menu copy screen, the names of the other processing apparatuses 11 included in the data processing system 1 are displayed as a list (left portion).

When the user selects the name of the source processing apparatus 11-1 from which the user menu screen is to be copied from the list and then operates an "Execute copying" button, the display instruction data acquisition unit 1172 of the processing instruction device 117 acquires second display instruction data from the processing apparatus 11 selected by the user via the packet data communication unit 1132, and stores the second display instruction data in the memory 1171.

If the second display instruction data is stored in the memory 1171, the changing unit 1173 performs a process for changing the first display instruction data. As a result, a user menu screen (FIG. 15D) having commonality with the user menu screen displayed on the source processing apparatus 11 is displayed on the destination processing apparatus 11.

EXEMPLARY MODIFICATIONS

The present invention is not limited to the foregoing exemplary embodiment, and a variety of modifications may be made. Some exemplary modifications will be given hereinafter. Two or more of the following exemplary modifications may be used in combination.

First Exemplary Modification

In the foregoing exemplary embodiment, in order to share display instruction data (the display position ID and processing ID portion of first display instruction data) between multiple processing apparatuses 11, a user operates the destination processing apparatus 11 to which the display instruction data is to be copied to acquire second display instruction data from the source processing apparatus 11. However, the method for sharing display instruction data between multiple processing apparatuses 11 is not limited to the method described above. For example, a management server device configured to manage second display instruction data on a user-by-user basis may be provided, and each processing apparatus 11 may acquire second display instruction data associated with each individual user from the management server device to share display instruction data between the multiple processing apparatuses 11. Alternatively, for example, each time a predetermined time period has elapsed, each processing apparatus 11 may broadcast second display instruction data stored therein to other processing apparatuses 11, and, upon receiving new second display instruction data broadcast from another processing apparatus 11, update the first display instruction data stored therein using the received second display instruction data so that the first display instruction data stored in each of the multiple processing apparatuses 11 may be synchronized with the first display instruction data stored in the other processing apparatuses 11.

Second Exemplary Modification

In the foregoing exemplary embodiment, user authentication is performed by checking the user ID and authentication code recorded on an NFC card against those in the authentication server device 13. The user authentication method is not limited to that described above, and any other method may be used to authenticate a user. For example, the user may input a user ID and a password to the operation device 116, and the input data may be checked against that in the authentication server device 13. In addition, the location where verification for authentication is to be performed is not limited to the authentication server device 13. For example, each of the processing apparatuses 11 may store a user authentication table, and may perform verification for authentication.

Third Exemplary Modification

In the foregoing exemplary embodiment, user menu screens are used on a user-by-user basis. A custom menu screen which is commonly available to all users may be used instead of or in addition to a user menu screen.

Fourth Exemplary Modification

In the foregoing exemplary embodiment, the processing instruction device 117 is integrated with other devices such as the image forming device 111 into the processing apparatus 11. Alternatively, the processing instruction device 117 may be formed as a device independent of the processing apparatus 11. For example, a computer such as a slate personal computer (PC) having a touch display may be caused to execute processing in accordance with the program according to the exemplary embodiment disclosed herein, thereby causing the computer to function as the processing instruction device 117. In this case, a processing apparatus 11 which does not include the processing instruction device 117 and the processing instruction device 117 implemented by the computer may communicate data to each other via wired or wireless connections.

Fifth Exemplary Modification

In the foregoing exemplary embodiment, each of the processing apparatuses 11 includes the image forming device 111, the imaging device 112, and the data communication device 113. However, each of the processing apparatuses 11 may have any other device configuration. For example, each of the processing apparatuses 11 may not necessarily include some of these devices, and may further include any additional device. Alternatively, instead of the processing apparatuses 11, any other type of device may be used. That is, any processing apparatus capable of executing multiple processing operations and configured to execute a processing operation selected by a user from among the multiple processing operations may be used.

Sixth Exemplary Modification

In the foregoing exemplary embodiment, the processing instruction device 117 is implemented by the processor 101 performing processing in accordance with a program. The processing instruction device 117 may be formed as a dedicated device.

Seventh Exemplary Modification

In the foregoing exemplary embodiment, no discussion has been made of the form how a program to be executed by the processor 101 in the processing instruction device 117 is provided. The program may be provided in the form of being recorded on a computer-readable recording medium such as a magnetic recording medium, an optical recording medium, a magneto-optical recording medium, or a semiconductor memory, or may be provided in the form being downloaded via a network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing instruction device comprising:
a memory that stores management data and first display instruction data,
the management data being data for managing one or more pieces of processing instruction data each being data for instructing at least one of an image forming device, an imaging device, and a data communication device to perform processing,
the first display instruction data being data for giving an instruction to display an image which prompts a user to select one of one or more pieces of processing instruction data among the one or more pieces of processing instruction data managed in the management data;
a display instruction data acquisition unit that acquires, from an external device, second display instruction data for giving an instruction to display an image which prompts a user to select one of one or more pieces of processing instruction data,
the management data including one or more pieces of processing instruction data available on a processing apparatus including the processing instruction device, first processing identification data uniquely identifying each of the one or more pieces of processing instruction data in the processing apparatus, and second processing identification data uniquely identifying each of the one or more pieces of processing instruction data in the processing apparatus and the external device,
the first display instruction data including display position identification data identifying a display position of an operator in an image, the operator corresponding to each of one or more pieces of processing instruction data for prompting a user to select processing, and first processing identification data uniquely identifying each of the one or more pieces of processing instruction data in the processing apparatus,
the second display instruction data including display position identification data identifying a display position of an operator in an image, the operator corresponding to each of one or more pieces of processing instruction data for prompting a user to select processing, and second processing identification data uniquely identifying each of the one or more pieces of processing instruction data in the processing apparatus and the external device;
a changing unit that specifies second processing identification data corresponding to each of the one or more pieces of display position identification data included in the first display instruction data, from among the one or more pieces of second processing identification data included in the second display instruction data, specifies first processing identification data corresponding to the specified second processing identification data from among the one or more pieces of first processing identification data included in the management data, and changes the first processing identification data corresponding to the piece of display position identification data included in the first display instruction data to the specified first processing identification data;
a display controller that causes a display device to display an image in accordance with the first display instruction data or the second display instruction data;

an operation data acquisition unit that acquires operation data indicating an operation of a user from an operation device that receives a user operation; and a processing instruction unit that instructs at least one of the image forming device, the imaging device, and the data communication device to, in a case where the operation data acquisition unit acquires operation data indicating an operation on one of one or more operators included in an image while the image is being displayed on the display device, perform processing in accordance with processing instruction data corresponding to the one operator.

2. The processing instruction device according to claim 1, wherein in a case where the management data stored in the memory is changed, the changing unit changes the first display instruction data using the changed management data.

3. The processing instruction device according to claim 1, further comprising a user identification data acquisition unit that acquires user identification data identifying a user, wherein the memory stores a plurality of pieces of first display instruction data each relating to a user, the display instruction data acquisition unit acquires, from the external device, second display instruction data relating to a user identified by user identification data acquired by the user identification data acquisition unit, and the changing unit changes first display instruction data relating to the user identified by the user identification data acquired by the user identification data acquisition unit from among the plurality of pieces of first display instruction data stored in the memory.

4. The processing instruction device according to claim 2, further comprising a user identification data acquisition unit that acquires user identification data identifying a user, wherein the memory stores a plurality of pieces of first display instruction data each relating to a user, the display instruction data acquisition unit acquires, from the external device, second display instruction data relating to a user identified by user identification data acquired by the user identification data acquisition unit, and the changing unit changes first display instruction data relating to the user identified by the user identification data acquired by the user identification data acquisition unit from among the plurality of pieces of first display instruction data stored in the memory.

5. A processing apparatus comprising:

the processing instruction device according to claim 1;

at least one of an image forming device, an imaging device, and a data communication device that performs processing in accordance with an instruction made by the processing instruction unit of the processing instruction device;

a display device that displays an image under control of the display controller of the processing instruction device; and an operation device that delivers operation data indicating an operation of a user to the operation data acquisition unit of the processing instruction device.

6. A non-transitory computer readable medium storing a program causing a computer to execute a process, the process comprising:

storing management data and first display instruction data, the management data being data for managing one or more pieces of processing instruction data each being data for instructing at least one of an image forming device, an imaging device, and a data communication device to perform processing, the first display instruction data being data for giving an instruction to display an image which prompts a user to select one of one or more pieces of processing instruction data among the one or more pieces of processing instruction data managed in the management data;

acquiring, from an external device, second display instruction data for giving an instruction to display an image which prompts a user to select one of one or more pieces of processing instruction data, the management data including one or more pieces of processing instruction data available on the computer, first processing identification data uniquely identifying each of the one or more pieces of processing instruction data in the computer, and second processing identification data uniquely identifying each of the one or more pieces of processing instruction data in the computer and the external device, the first display instruction data including display position identification data identifying a display position of an operator in an image, the operator corresponding to each of one or more pieces of processing instruction data for prompting a user to select processing, and first processing identification data uniquely identifying each of the one or more pieces of processing instruction data in the computer, the second display instruction data including display position identification data identifying a display position of an operator in an image, the operator corresponding to each of one or more pieces of processing instruction data for prompting a user to select processing, and second processing identification data uniquely identifying each of the one or more pieces of processing instruction data in the computer and the external device;

specifying second processing identification data corresponding to each of the one or more pieces of display position identification data included in the first display instruction data, from among the one or more pieces of second processing identification data included in the second display instruction data, specifying first processing identification data corresponding to the specified second processing identification data from among the one or more pieces of first processing identification data included in the management data, and changing the first processing identification data corresponding to the piece of display position identification data included in the first display instruction data to the specified first processing identification data;

causing a display device to display an image in accordance with the first display instruction data or the second display instruction data;

acquiring operation data indicating an operation of a user from an operation device that receives a user operation; and in a case where operation data indicating an operation on one of one or more operators included in an image is acquired from the operation device while the image is being displayed on the display device, instructing at least one of the image forming device, the imaging device, and the data communication device to perform processing in accordance with processing instruction data corresponding to the one operator.

* * * * *